United States Patent
Guilloux et al.

(10) Patent No.: US 10,371,963 B2
(45) Date of Patent: Aug. 6, 2019

(54) METHOD OF MANUFACTURING AN OPHTHALMIC LENS

(71) Applicant: Essilor International, Charenton-le-Pont (FR)

(72) Inventors: Cyril Guilloux, Charenton le Pont (FR); Jean-Marc Padiou, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 14/653,623

(22) PCT Filed: Dec. 18, 2013

(86) PCT No.: PCT/EP2013/077080
§ 371 (c)(1),
(2) Date: Jun. 18, 2015

(87) PCT Pub. No.: WO2014/095993
PCT Pub. Date: Jun. 26, 2014

(65) Prior Publication Data
US 2015/0370089 A1  Dec. 24, 2015

(30) Foreign Application Priority Data
Dec. 18, 2012 (EP) .................................... 12306606

(51) Int. Cl.
*G02C 7/02* (2006.01)
*C03B 23/00* (2006.01)
(Continued)

(52) U.S. Cl.
CPC ........ *G02C 7/028* (2013.01); *B29D 11/00451* (2013.01); *C03B 23/0026* (2013.01);
(Continued)

(58) Field of Classification Search
CPC .............. B29D 11/00451; G02C 7/024; C03B 23/0026
(Continued)

(56) References Cited

U.S. PATENT DOCUMENTS 1,536,828 A    5/1925  Drescher
6,012,965 A *  1/2000  Savoie ................ B24B 13/0055
                                                         451/384
(Continued)

FOREIGN PATENT DOCUMENTS

FR    2 109 010         5/1972
FR       2109010 A  *   5/1972
(Continued)

OTHER PUBLICATIONS

FR2109010 Translation.*

*Primary Examiner* — Stephone B Allen
*Assistant Examiner* — Travis S Fissel
(74) *Attorney, Agent, or Firm* — Oblon, McClelland, Maier & Neustadt, L.L.P.

(57) ABSTRACT

A method of manufacturing an ophthalmic lens comprising: an ophthalmic lens data providing step (S1) during which ophthalmic lens data corresponding are provided, a semi-finished lens blank providing step (S2) during which a semi-finished lens blank is provided, a transfer function determining step (S3) during which the transfer function to be applied to the first optical surface of the ophthalmic lens so as to correspond to the first lens blank surface is determined, an one side lens data calculating step (S4) during which one side lens having second surface that corresponds to the second optical surface calculated by applying the transfer function, a machining step (S5) during which the semi-finished lens blank is machined according to the one side lens data, a deforming step (S6) during which the (Continued)

machined semi-finished lens blank is deformed so as to obtain the ophthalmic lens.

16 Claims, 6 Drawing Sheets

(51) Int. Cl.
    *G02C 7/06*              (2006.01)
    *B29D 11/00*           (2006.01)
    *B29C 51/00*           (2006.01)

(52) U.S. Cl.
    CPC ................ *G02C 7/02* (2013.01); *G02C 7/061* (2013.01); *G02C 7/068* (2013.01); *B29C 51/00* (2013.01)

(58) Field of Classification Search
    USPC .................. 351/159.71–159.77, 178, 159.01, 351/159.05–159.07, 159.1, 159.11, 159.2, 351/159.21, 159.37, 159.38, 351/159.41–159.44; 264/1.8, 2.2–2.4
    See application file for complete search history.

(56) References Cited

U.S. PATENT DOCUMENTS

| | | |
|---|---|---|
| 2003/0111747 A1 | 6/2003 | Chiu et al. |
| 2007/0021036 A1* | 1/2007 | Kuebler .................. B24B 13/02 451/5 |
| 2011/0228225 A1* | 9/2011 | Liang ....................... G02C 7/02 351/159.01 |

FOREIGN PATENT DOCUMENTS

| | | | |
|---|---|---|---|
| FR | 2109010 A1 * | 5/1972 | ......... C03B 23/0026 |
| WO | WO 2004/046795 | 6/2004 | |

* cited by examiner

METHOD OF MANUFACTURING AN OPHTHALMIC LENS

RELATED APPLICATIONS

This is a U.S. national stage application under 35 USC § 371 of application No. PCT/EP2013/077080, filed on Dec. 18, 2013. This application claims the priority of European application no. 12306606.0 filed Dec. 18, 2012, the entire content of which is hereby incorporated by reference.

FIELD OF THE INVENTION

The invention relates to a method of manufacturing an ophthalmic lens, a computer program product and a computer readable medium.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Some processes of preparing ophthalmic lenses start with the selection of an unfinished or semi-finished lens blank. Typically a semi-finished lens blank has a finished surface and an unfinished surface.

At least one of the surfaces of the lens blank has to be adapted so as to generate the required corrective prescription.

By machining the unfinished surface of the lens blank, the required corrective prescription can be generated.

Thereafter, the surface having been machined is polished and the peripheral edge of the thus processed lens blank is provided with a final desired contour thereby establishing a finished optical or ophthalmic lens.

According to other processing methods, the finished ophthalmic lens can be directly processed from a lens blank by machining both surfaces of the optical lens blank.

The progress made in the lens manufacturing process allows producing ophthalmic lenses that have complex designs on two optical surfaces, for example the front and back surfaces of an ophthalmic lens.

One of the difficulties when manufacturing ophthalmic lenses having at least two complex surfaces is to guaranty an accurate position of both complex surfaces relative to each other, especially when these two surfaces are progressive or regressive surfaces. Indeed, the complex designs being usually asymmetry, the relative positions of these two surfaces are very important.

Guarantying an accurate position of the two complex surfaces is complex and requires modifying the lens manufacturing process.

SUMMARY OF THE INVENTION

One object of the invention is to provide a method of manufacturing an ophthalmic lens that does not present the drawbacks mentioned hereinabove.

To this end, one aspect of the invention is directed to a method of manufacturing an ophthalmic lens, the method comprising:
- an ophthalmic lens data providing step during which ophthalmic lens data corresponding to a first and second optical surfaces, a thickness and a prism of the ophthalmic lens to be manufactured are provided,
- a semi-finished lens blank providing step during which a semi-finished lens blank having a first and second lens blank surfaces is provided,
- a transfer function determining step, during which the transfer function to be applied to the first optical surface of the ophthalmic lens so as to correspond to the first lens blank surface is determined,
- an one side lens data calculating step during which one side lens data corresponding to a first and second optical surfaces, a thickness and a prism of an one side lens are determined, wherein the first surface of the one side lens corresponds to the first lens blank surface, the prism and the thickness of the one side lens are substantially equal to the prism and thickness of the ophthalmic lens and the second surface of the one side lens corresponds to the second optical surface calculated by applying the transfer function,
- a machining step during which the semi-finished lens blank is machined according to the one side lens data so as to obtain a machined semi-finished lens blank,
- a deforming step during which the machined semi-finished lens blank is deformed so as to transform the first and second surfaces of the machined semi-finished lens blank into respectively the first and second optical surfaces of the ophthalmic lens.

Advantageously, the manufacturing method according to an embodiment of the invention allows providing an ophthalmic lens having two complex optical surfaces while having machined only one surface.

According to further embodiments which can be considered alone or in combination:
- the ophthalmic lens data comprise an ophthalmic lens reference point used as a reference point during the transfer function determining step and the deformation step; and/or
- the ophthalmic lens is a single vision ophthalmic lens and the reference point is the optical center of the single vision lens; and/or
- the ophthalmic lens is a progressive multifocal ophthalmic lens and the reference point is the prism reference point; and/or
- during the deformation step, the machined semi-finished lens blank is deformed by forming the first surface of the machined semi-finished lens blank against a mold having a surface arranged so as to deform the first surface of the machined semi-finished lens blank according to the inverse transfer function of the transfer function; and/or
- the forming process of the lens is a thermo-forming process where the lens is heated nearby glass transition temperature; and/or
- the forming process is assisted by vacuum or air pressure; and/or
- the mold is a prefabricated mold or a programmable mold; and/or
- the transfer function is a transformation function along the axe which is perpendicular to the first surface of the ophthalmic lens at the reference point; and/or
- the first surface of the semi-finished lens blank is a spherical surface; and/or
- the first surface of the semi-finished lens blank is a toric surface; and/or
- the difference of optical index, ie refractive index, between the semi-finished lens blank and the ophthalmic lens is smaller than or equal to 5%; and/or
- the first surfaces of the ophthalmic lens and of the semi-finished lens blank are front surfaces; and/or the front surface of the ophthalmic lens is a progressive or a regressive surface; and/or prior to the ophthalmic lens data providing step the method further comprises an ophthalmic lens data determining step during which the ophthalmic lens data are determined according at least to a wearer prescription.

According to a further aspect, the invention relates to a computer program product comprising one or more stored sequence of instruction that is accessible to a processor and which, when executed by the processor, causes the processor to carry out the steps of the method according to the invention.

Another aspect of the invention relates to a program which makes a computer execute the method according to an embodiment of the invention.

Another aspect of the invention relates to a computer readable medium carrying one or more sequences of instructions of the computer program according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of a method according to an embodiment of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings wherein.

DETAILED DESCRIPTION OF THE DRAWINGS

Elements in the figures are illustrated for simplicity and clarity and have not necessarily been drawn to scale. For example, the dimensions of some of the elements in the figures may be exaggerated relative to other elements to help improve the understanding of the embodiments of the present invention.

Figure 1:
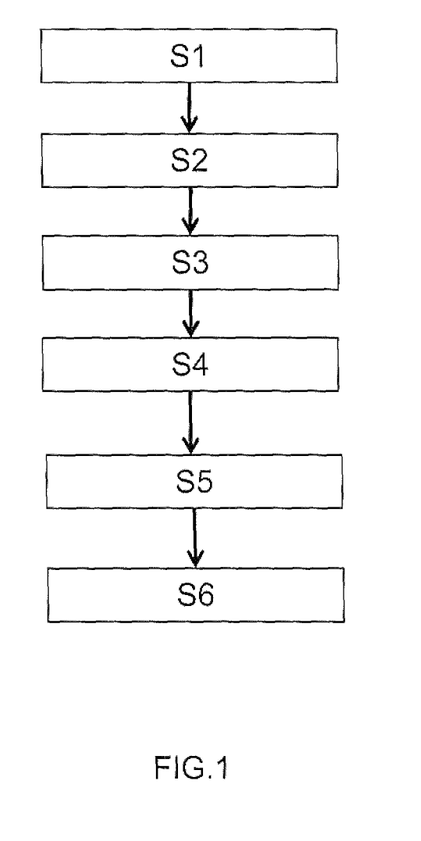
FIG. 1 is a flowchart of the steps of a method according to an embodiment of the invention.

According to an embodiment of the invention illustrated on FIG. 1, the method of manufacturing an ophthalmic lens according to the invention, comprises:
    an ophthalmic lens data providing step S1,
    a semi-finished lens blank providing step S2,
    a transfer function determining step S3,
    an one side lens data calculating step S4,
    a machining step S5, and
    a deforming step S6.

According to an embodiment of the invention, the ophthalmic lens data are provided during the ophthalmic lens data providing step S1. The ophthalmic lens data define the ophthalmic lens to be manufactured.

For example, the ophthalmic lens data comprise data related to a first and a second optical surfaces, the thickness and prism of the ophthalmic lens to be manufactured.

Figure 2:
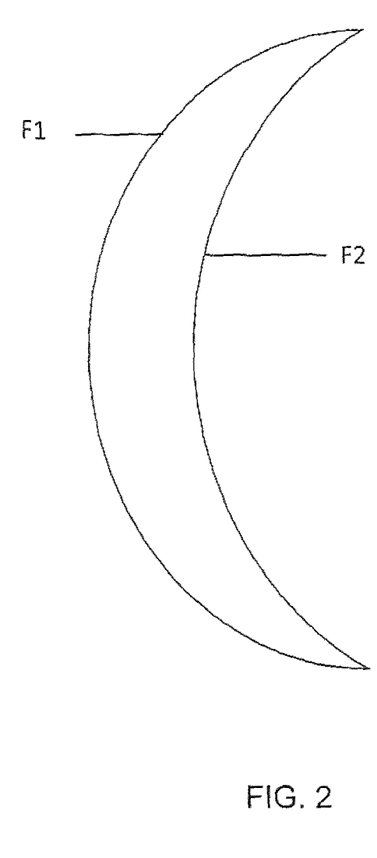
FIG. 2 represents an ophthalmic lens to be manufactured using a method according to an embodiment of the invention.

As illustrated on FIG. 2, the first and second optical surfaces can be respectively the front F1 and back surfaces F2 of the ophthalmic lens to be manufactured. Although the ophthalmic lens represented on FIG. 2 is convex, the method according to the invention may very well be used for manufacturing concave lenses.

According to an embodiment, the surfaces of the ophthalmic lens may be progressive or regressive surfaces.

By "progressive surface" is meant a continuous, aspheric surface having distance and near viewing or vision zones, and a zone of increasing dioptric power connecting the distance and near zones. One ordinarily skilled in the art will recognize that, if the progressive surface is the convex surface of the lens, the distance vision zone curvature will be lower than that of the near zone curvature and if the progressive surface is the lens' concave surface, the distance curvature will be greater than that of the near zone.

By "regressive surface" is meant a continuous, aspheric surface having zones for distance and near viewing or vision, and a zone of decreasing dioptric power connecting the distance and near zones. If the regressive surface is the convex surface of the lens, the distance vision zone curvature will be greater than that of the near zone and if the regressive surface is the lens' concave surface, the distance curvature will be lower than that of the near zone.

According to an embodiment of the invention, the method may comprise prior to the ophthalmic lens data providing step S1 an ophthalmic lens data determining step during which the ophthalmic lens data are determined according at least to a wearer prescription.

During the ophthalmic lens data determining step other wearer parameters than the prescription can be considered, for example the surfaces of the first and second optical surfaces may be determined so as to reduce optical aberrations and/or image deformation. Lens having two complex surfaces help to manage the lens performance. In general, such lens surfaces are the result of an optimization process allowing reaching the desired performance.

According to an embodiment of the invention, the ophthalmic lens data may comprise an ophthalmic lens reference point. So as to guarantee the relative positions of the first and second surfaces of the manufactured ophthalmic lens, such reference point is used as a reference point during the transfer function determining step S3 and the deformation step S6.

The ophthalmic lens may be a single vision ophthalmic lens and for practical purposes, the reference point may be the optical center of the single vision lens. The optical center is defined as the intersection of the optical axis with the front surface of the ophthalmic single vision lens.

The ophthalmic lens may be a progressive multifocal ophthalmic lens.

Progressive lenses comprise micro-markings that have been made mandatory by a harmonized standard ISO 8980-2. Such micro-markings can be used to define a reference point.

Temporary markings may also be applied on the surface of the lens, indicating positions of control points on the lens, such as a control point for far vision, a control point for near vision, a prism reference point and a fitting cross. If the temporary markings are absents or have been erased, it is always possible for a skilled person to position the control points on the lens by using a mounting chart and the permanent micro-markings. The temporary markings may also be used to define a reference point in the sense of the invention.

Figure 3:
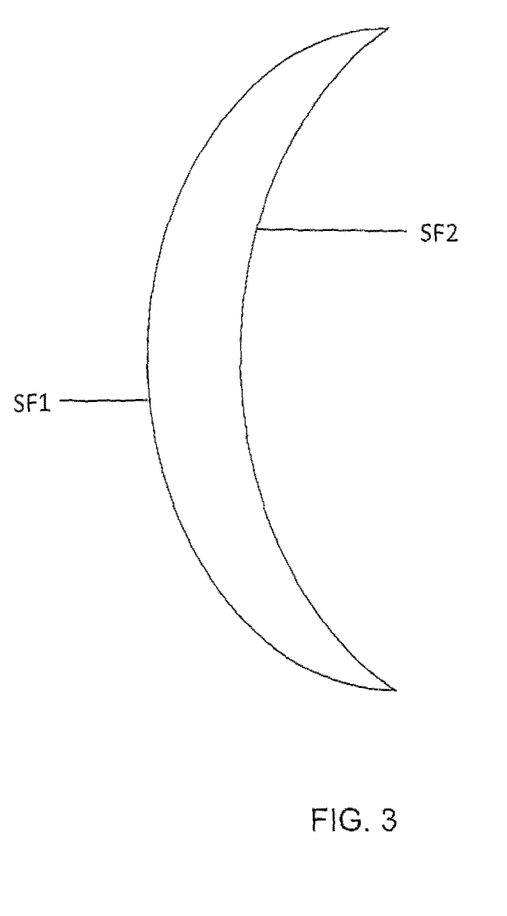
FIG. 3 represents a semi-finished lens blank used during the method according to an embodiment of the invention.

As illustrated on FIGS. 1 and 3, during the semi-finished lens blank providing step S2, a semi-finished lens blank having a first SF1 and a second SF2 lens blank surfaces is provided.

So as to simplify and increase the accuracy of the manufacturing method according to the invention, the difference of optical index between the semi-finished lens blank provided during the semi-finished lens blank providing step S2 and the ophthalmic lens to be manufactured as defined by the ophthalmic lens data, is smaller than or equal to 5%, for example smaller than or equal to 2%.

According to an embodiment so as to simplify the transfer function and the deformation step, the first surface of the semi-finished lens blank can be spherical, i.e. without variation of curvature. Advantageously, having a spherical first surface of the semi-finished lens blank allows a greater relative positioning error tolerance between the first and second surfaces of the manufactured ophthalmic lens. Indeed, having a spherical first surface of the semi-finished lens blank guaranties that the wearer prescription is satisfied even with a relative positioning error of the first and second surfaces of the manufactured ophthalmic lens.

According to an embodiment, the first surface of the semi-finished ophthalmic lens is a toric surface.

During the transfer function determining step S3, the transfer function T to be applied to the first optical surface of the ophthalmic lens so as to correspond to the first lens blank surface is determined.

In other words, the transfer function T is defined by: T(F1)=SF1, with F1 the first optical surface of the ophthalmic lens and SF1 the first lens blank surface.

According to an embodiment, the transfer function can be a transformation function along the axe perpendicular to the plane tangent to the first surface of the ophthalmic lens at the reference point.

Figure 4:
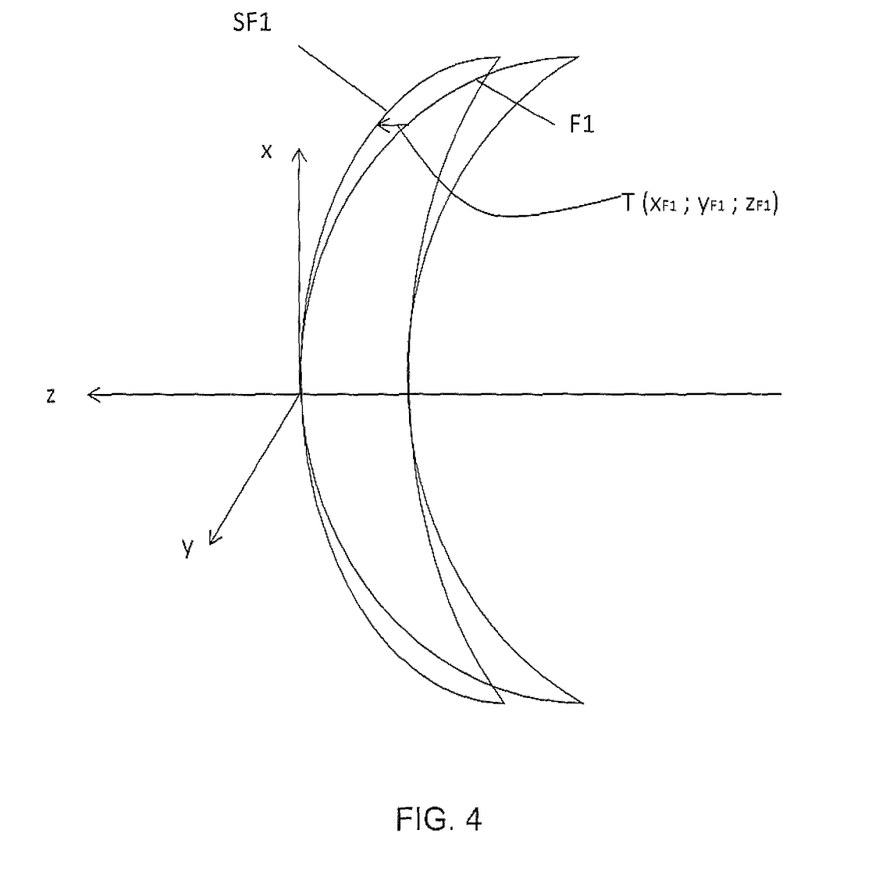
FIG. 4 illustrates the transfer function determining step according to an embodiment of the invention.

As illustrated on FIG. 4, the transfer function T can be determined by virtually placing the first optical surface F1 and the first lens blank surface SF1 in an Cartesian reference system (O,X,Y,Z). The surfaces are positioned so that the reference points of the first optical surface F1 and of the first lens blank surface SF1 are placed at the origin point O of the Cartesian reference system, and in such a way to have the same tangent plane at this origin point O.

Each point $(x_{F1}, y_{F1}, z_{F1})$ of the first optical surface F1 is projected along the Z-axis on the first lens blank surface SF1 providing a projection point $(x_{F1}, y_{F1}, z_{SF1})$. The transfer function T can be defined for each point of the first optical surface as:

$$z_{SF1} = T(x_{F1}, y_{F1}).$$

According to an embodiment of the invention, the first surfaces of the ophthalmic lens and of the semi-finished lens blank are front surfaces.

During the one side lens data calculating step S4, one side lens data corresponding to an one side lens are calculated. The one side lens data comprise data relating to a first and a second optical surfaces, a thickness and a prism of the one side lens.

Figure 5:
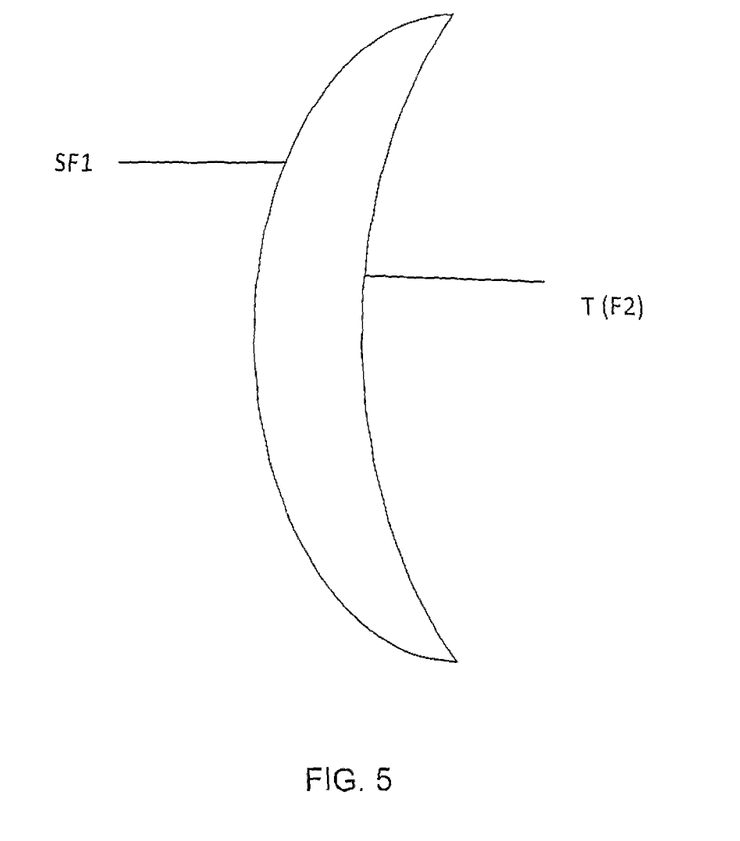
FIG. 5 represents an one side lens corresponding to the one side lens data calculated during the method according to an embodiment of the invention.

As illustrated on FIG. 5, the one side lens has substantially the same thickness and prism as the ophthalmic lens to be manufactured. The first optical surface of the one side lens corresponds to the first lens blank surface SF1. The second optical surface of the one side lens is calculated by applying the transfer function T to the second optical surface of the ophthalmic lens to be manufactured.

In other words, the second optical surface of the one side lens corresponds to T(F2), with T the transfer function determined during the transfer function determining step S3 and F2 the second optical surface of the ophthalmic lens to be manufactured.

During the one side lens data calculating step, the optical function of the one side lens is not calculated, making such calculating step easy to implement.

During the machining step S5, the semi-finished lens blank is machined according to the one side lens data determined during the one side lens data calculating step S4.

For example, the semi-fished lens blank is blocked on the first lens blank surface using a lens blocker. Once blocked in position the second lens blank surface is machined so as to obtain a machined semi-fished blank having substantially the same thickness and prism and first and second optical surfaces as the calculated one side lens.

In other words, the machined semi-fished lens blank has substantially the same thickness and prism as the ophthalmic lens to be manufactured and the first optical surface of the machined semi-fished lens blank corresponds to the first semi-finished lens blank surface and the second optical surface of the machined semi-fished lens blank corresponds to T(F2) with T the transfer function and F1 the second optical of the ophthalmic lens to be manufactured.

During the deforming step S6, the machined semi-finished lens blank is deformed so as to transform the first and second surfaces of the machined semi-finished lens blank into respectively the first and second optical surfaces of the ophthalmic lens.

Figure 6:
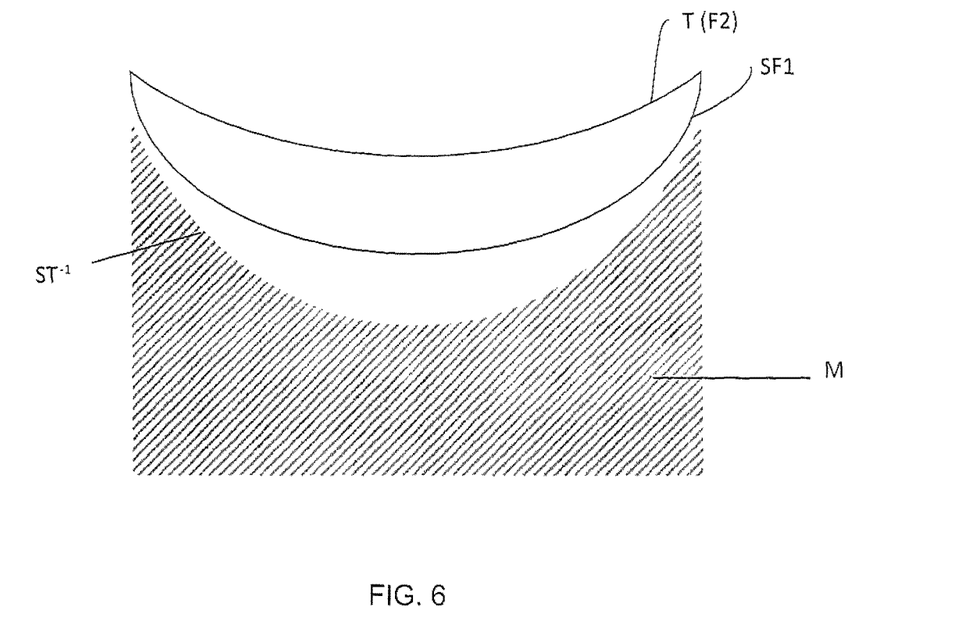
FIG. 6 illustrates a deforming step according to an embodiment of the invention.

According to an embodiment of the invention represented on FIG. 6, the machined semi-finished lens blank is deformed by forming the first surface SF1 of the machined semi-finished lens blank against a mold M having a surface $ST^{-1}$ arranged so as to deform the first surface SF1 of the machined semi-finished lens blank according to the inverse transfer function $T^{-1}$ of the transfer function T determined during the transfer function determining step.

Therefore, the machined semi-finished lens blank is deformed by applying the inverse transfer function $T^{-1}$ to the first and second optical surfaces of the machined semi-finished lens blank.

The first optical surface SF1 of the machined semi-finished lens blank is deformed according to the inverse transfer function $T^{-1}$. Since the transfer function has been determined as the function to be applied to the first optical surface of the ophthalmic lens to be manufactured so as to correspond to the first lens blank surface SF1, i.e. T(F1)=SF1; the inverse transfer function $T^{-1}$ applied to the first surface SF1 of the machined semi-finished lens blank provides the first optical surface of the ophthalmic lens to be manufactured, i.e. $T^{-1}(SF1)=T^{-1}(T(F1))=F1$.

The second optical surface T(F2) of the machined semi-finished lens blank is deformed according to the inverse transfer function $T^{-1}$. Since the second optical surface of the machined semi-finished lens blank corresponds to a transfer surface obtained by applying the transfer function T to the second surface S2 of the ophthalmic lens to be manufactured, i.e. T(F2); the inverse transfer function $T^{-1}$ applied to the second surface T(F2) of the machined semi-finished lens blank provides the second optical surface of the ophthalmic lens to be manufactured, i.e. $T^{-1}(T(F2))=F2$.

According to different embodiments of the invention, the forming can be obtained by thermoforming against a prefabricated mold or a programmable mold.

Figure 7:
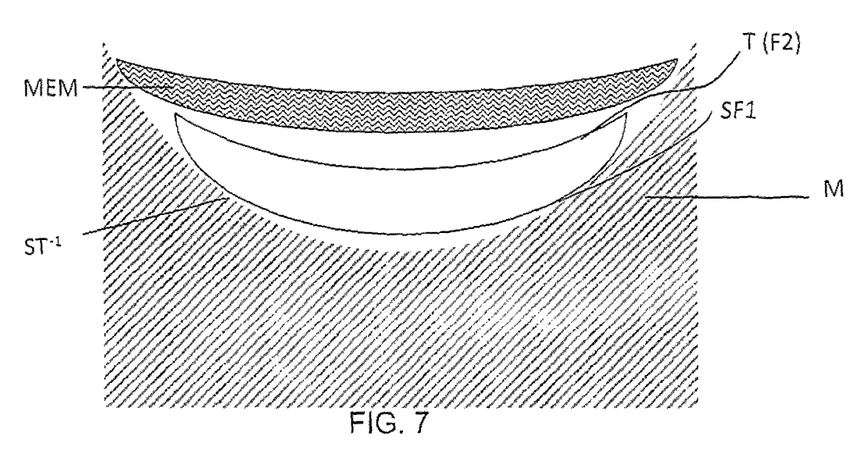
FIG. 7 illustrates a deforming step according to a further embodiment of the invention.

According to an embodiment illustrated on FIG. 7, during the deforming step S6, the machined one side lens is heated to the glass transition temperature of the material forming the lens. The lens may be heating in an oven or direct against the mold.

Once heated at the glass transition temperature, the machined one side lens is positioned on the mold M and pressed against the surface $ST^{-1}$ using a membrane MEM inflated with a fluid, for example air, water or oil. The machined one side lens may be pressed against the surface $ST^{-1}$ using a elastomeric pad.

After being thermo formed, the optical lens is cooled to a lower temperature so as to fix the new form thus obtained.

The invention may be used for example to manufacture a progressive addition lens having a toric front surface, with the minimum principal curvature of the surface C1min=5, the maximum principal curvature of the surface C1max=7 and Ax1=45°; and a progressive addition rear surface with the minimum principal curvature of the surface at the far vision point C2min=5, the maximum principal curvature of the surface at the far vision point C2max=7, Ax2=45° and a surface addition of 2.5 D; a thickness of 2 mm at the reference point and a prism of ⅔ of the addition.

During the semi-finished lens blank providing step S2 a semi-finished lens blank with a spherical front surface (Cb1min=Cb1max=6) is provided.

During the machining step, the back surface of the semi-finished lens blank is manufactured according to the one side lens data obtained during the one side lens data calculating step so as to have machined back surface with the minimum principal curvature of the surface at the far vision point Cb2min=6, the maximum principal curvature of the surface at the far vision point Cb2max=6 and a surface addition of 2.5 D.

During the deforming step S6, the machined semi-finished lens blank is slumped on a mold having a toric surface corresponding to the first optical surface of the ophthalmic lens to be manufactured.

Advantageously, the method according to the invention allows manufacturing a two complex surfaces ophthalmic lens from a spherical front surface semi-finished lens blank and having machined only one surface of the semi-finished lens blank.

The invention has been described above with the aid of embodiments without limitation of the general inventive concept. In particular, the invention has been illustrated using convex lenses however the method according to the invention can used with concave lenses.

The invention claimed is:

1. A method of manufacturing an ophthalmic lens, the method comprising:
   prior to providing an ophthalmic lens data, determining the ophthalmic lens according at least to a wearer prescription;
   providing ophthalmic lens data corresponding to a first optical surface, a second optical surface, a thickness and a prism of the ophthalmic lens to be manufactured;
   providing a semi-finished lens blank having a first and second lens blank surfaces;
   determining a transfer function to be applied to the first optical surface of the ophthalmic lens so as to correspond to the first lens blank surface;
   calculating a one side lens data corresponding to a first optical surface, a second optical surface, a thickness and a prism of a one side lens, wherein a first surface of the one side lens corresponds to the first lens blank surface, the prism and the thickness of the one side lens are substantially equal to the prism and thickness of the ophthalmic lens and a second surface of the one side lens corresponds to the second optical surface calculated by applying the transfer function;
   machining only one of the first and second lens blank surfaces of the semi-finished lens blank according to the one side lens data by blocking the lens on one of the first and second lens blank surfaces and machining the other lens blank surfaces so as to obtain a machined semi-finished lens blank; and
   deforming the machined semi-finished lens blank by heating the machined semi-finished lens blank, positioning the machined semi-finished lens blank on a mold, deforming the machined semi-finished lens blank against a surface of the mold to obtain a new form corresponding to an ophthalmic lens and cooling to fix the new form so as to transform the first and second surfaces of the machined semi-finished lens blank into respectively the first and second optical surfaces of the ophthalmic lens.

2. The method according to claim 1, wherein the ophthalmic lens data comprise an ophthalmic lens reference point used as a reference point during the determining of the transfer function and the deforming.

3. The method according to claim 2, wherein the ophthalmic lens is a single vision ophthalmic lens and the reference point is the optical center of the single vision lens.

4. The method according to claim 2, wherein the ophthalmic lens is a progressive multifocal ophthalmic lens and the reference point is the prism reference point.

5. The method according to claim 1, wherein during the deforming, the machined semi-finished lens blank is deformed by thermo-forming the first surface of the machined semi-finished lens blank against a mold having a surface arranged so as to deform the first surface of the machined semi-finished lens blank according to the inverse transfer function of the transfer function.

6. The method according to claim 5, wherein the mold is a prefabricated mold or a programmable mold.

7. The method according to claim 2, wherein the transfer function is a transformation function along an axis perpendicular to the first surface of the ophthalmic lens at the reference point.

8. The method according to claim 1, wherein the first surface of the semi-finished lens blank is a spherical surface.

9. The method according to claim 1, wherein the first surface of the semi-finished lens blank is a toric surface.

10. The method according to claim 1, wherein the difference of refractive index between the semi-finished lens blank and the ophthalmic lens is smaller than or equal to 5%.

11. The method according to claim 1, wherein the first surfaces of the ophthalmic lens and of the semi-finished lens blank are front surfaces.

12. The method according to claim 1, wherein the front surface of the ophthalmic lens is a progressive or a regressive surface.

13. A computer program product comprising one or more stored sequences of instructions that are stored on a non-transitory computer memory and that are accessible to a processor and which, when executed by the processor, causes the processor to carry out the method of claim 1.

14. A computer readable medium carrying one or more sequences of instructions of the computer program product of claim 13.

15. The method according to claim 1, wherein none of the first and second lens blank surfaces in the semi-finished lens blank is polished.

16. A method of manufacturing an ophthalmic lens, the method comprising:
(a) determining the ophthalmic lens according at least to a wearer prescription;
(b) providing ophthalmic lens data corresponding to a first optical surface, a second optical surface, a thickness and a prism of the ophthalmic lens to be manufactured;
(c) providing a semi-finished lens blank having a first and second lens blank surfaces;
(d) determining a transfer function to be applied to the first optical surface of the ophthalmic lens so as to correspond to the first lens blank surface;
(e) calculating a one side lens data corresponding to a first optical surface, a second optical surface, a thickness and a prism of a one side lens, wherein a first surface of the one side lens corresponds to the first lens blank surface, the prism and the thickness of the one side lens are substantially equal to the prism and thickness of the ophthalmic lens and a second surface of the one side lens corresponds to the second optical surface calculated by applying the transfer function;
(f) machining only one of the first and second lens blank surfaces of the semi-finished lens blank according to the one side lens data by blocking the lens on one of the first and second lens blank surfaces and machining the other lens blank surface so as to obtain a machined semi-finished lens blank; and
(g) deforming the machined semi-finished lens blank by heating the machined semi-finished lens blank, positioning the machined semi-finished lens blank on a mold, deforming the machined semi-finished lens blank against a surface of the mold to obtain a new form corresponding to an ophthalmic lens and cooling to fix the new form so as to transform the first and second surfaces of the machined semi-finished lens blank into respectively the first and second optical surfaces of the ophthalmic lens.

* * * * *